United States Patent

[11] 3,630,659

| [72] | Inventors | Udo-Winfried Hendricks<br>Cologne Stammheim;<br>Mathieu Quaedvlieg, Opladen; Walter<br>Schonberger, Leverkusen, all of Germany |
|---|---|---|
| [21] | Appl. No. | 696,700 |
| [22] | Filed | Jan. 10, 1968 |
| [45] | Patented | Dec. 28, 1971 |
| [73] | Assignee | Farbenfabriken Bayer Aktiengesellschaft<br>Leverkusen, Germany |
| [32] | Priority | Jan. 14, 1967 |
| [33] | | Germany |
| [31] | | F 51255 |

[54] PROCESS FOR PREVENTING DAMAGE TO NATURAL PROTEIN-CONTAINING FIBERS
2 Claims, No Drawings

[52] U.S. Cl. .................................................. 8/133,
8/128, 8/116.2, 8/115.7
[51] Int. Cl. .................................................. D06m 13/40
[50] Field of Search ........................................... 8/133, 128,
116.2, 115.7, 127.6, 172, 178

[56] References Cited
UNITED STATES PATENTS

| 2,890,097 | 6/1959 | Coe .............................. | 8/128 |
| 3,248,260 | 4/1966 | Langerak ..................... | 117/161 |
| 3,100,674 | 9/1963 | Steiger ......................... | 8/127.6 |
| 2,980,652 | 4/1961 | Metamed ..................... | 260/77.5 |
| 2,817,645 | 12/1957 | Weisgerber ................. | 260/78 |
| 3,078,185 | 2/1963 | Kine ............................. | 117/141 |
| 3,473,956 | 10/1969 | McIntyre ..................... | 117/138.8 |
| 3,232,692 | 2/1966 | Wilhelm ....................... | 8/18 |
| 3,334,960 | 8/1967 | Abel ............................. | 8/54 |
| 3,468,620 | 9/1969 | Schaeuble ................... | 8/54 |

*Primary Examiner*—George F. Lesmes
*Assistant Examiner*—B. Bettis
*Attorney*—Plumley, Tyner & Sandt ABSTRACT: Water soluble polyamides which are obtained by reacting aliphatic polyamines with $\alpha, \beta$-unsaturated aliphatic monocarboxylic acids or aliphatic polycarboxylic acids optionally containing hetero atoms or their functional derivatives capable of forming amides are used as agents for preventing damage to protein-containing fiber materials or mixtures of such materials by adding the polyamides to an acidic aqueous medium used to treat said fibers.

PROCESS FOR PREVENTING DAMAGE TO NATURAL PROTEIN-CONTAINING FIBERS

The present invention relates to a process for preventing damage to the fibers of natural protein-containing fiber materials, or mixtures of such fiber materials with vegetable or synthetic fiber materials, when these are treated in an acidic aqueous medium. More particularly it concerns a process which consists in that to the acidic aqueous medium there are added water-soluble polyamides obtained by reacting aliphatic polyamines of the formula

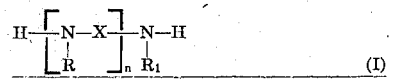

(I)

in which R and $R_1$, independently of one another, stand for hydrogen, an alkyl group or a hydroxyalkyl group with one–three carbon atoms, X is a 2-valent optionally substituted aliphatic radical with one–six carbon atoms, and $n$ stands for an integer from 1 to 4,
with $\alpha,\beta$-unsaturated aliphatic monocarboxylic acids or aliphatic polycarboxylic acids which may contain hetero atoms, or their functional derivatives capable of forming amides, for example, halides, amides, anhydrides or esters.

The natural protein-containing fiber materials primarily comprise those of wool and silk, the vegetable or synthetic fiber materials include those of cellulose, cellulose acetate, synthetic superpolyamides, polyacrylonitrile or aromatic polyesters, such as polyethylene glycol terephthalate, or condensation products of terephthalic acid and 1,4-bis-hydroxymethyl-cyclohexane.

Amines of the general formula (I) suitable for the preparation of the water-soluble polyamides to be used according to the present invention are, for example, ethylene-diamine, diethylene-triamine, triethylene-tetramine, tetraethylene-pentamine, bis-(3-amino-propyl)-amine, tripropylene-tetramine, N-(2-hydroxyethyl)-ethylene-diamine, hexamethylene-diamine, N,N'-dimethylethylene-diamine and bis-(3-aminopropyl)-methylamine.

As $\alpha,\beta$-unsaturated carboxylic acids there may be mentioned acrylic acid and methacrylic acid, and examples of aliphatic polycarboxylic acids optionally containing hetero atoms are succinic acid, adipic acid, maleic acid and diglycollic acid.

The water-soluble polyamides to be used according to the invention are known. They can be obtained, for example, by reacting amines of the formula (I) with $\alpha,\beta$-unsaturated carboxylic acids or polycarboxylic acids optionally containing hetero atoms or their functional derivatives capable of forming amides, at temperatures above 40° C. and, if desired, under reduced pressure.

The most advantageous proportions between the amines of the formula (I), on the one hand, and the $\alpha,\beta$-unsaturated carboxylic acids or polycarboxylic acids optionally containing hetero atoms or their functional derivatives capable of forming amides, can easily be established by preliminary experiments. It is also possible, by choosing suitable proportions, to obtain polyamides which still contain free primary or secondary amino groups.

The water-soluble polyamides to be used according to the invention advantageously have an average molecular weight of 400–2,000. Polyamides which still contain free primary or secondary amino groups can be brought to a pH value of 4–7 before being used with acids, expediently by means of lower aliphatic carboxylic acids, such as formic acid, acetic acid or glycollic acid.

The process according to the invention is primarily of importance for the dyeing of the aforesaid fiber materials, especially wool, hair, mixtures of wool and staple fiber, synthetic superpolyamides or polyacrylonitrile, from an aqueous acidic bath at an elevated temperature, 1–4 g. of water-soluble polyamide per litre of liquor being usually added to the dyebaths.

When natural protein-containing fiber materials are treated, for example dyed, in an aqueous acidic medium at an elevated temperature, damage to the fibers frequently occurs and becomes apparent in the form of modified properties of the fibers, for example, a decrease of the wet tear resistance and the resistance to abrasion, or an increase of the alkali-solubility of the fiber materials thus treated. By the addition of the water-soluble polyamides to be used according to the invention, which can also be used in the form of mixtures of the individual compounds, in the process described above a substantially lower reduction of the wet tear resistance and a substantially lower increase of the alkali-solubility is achieved.

The material to be treated can be used in any state of processing, for example, as flock, combed material, roving, yarn or piece goods, and in the case when the treatment is carried out while dyeing the fiber material, dyeing can be carried out by the known dyeing methods suitable for the fiber material concerned, in an acidic aqueous medium with the dyestuffs suitable for this purpose.

The parts given in the examples are parts by weight, the numbers of the dyestuffs refer to the data in Color Index, 2nd Edition. The wet tear resistance is determined according to German Industrial Standard 53 815, the alkali-solubility according to M. Harris and A. L. Smith (American Dyestuff Reporter 25, page 542, 1936).

EXAMPLE 1

25 parts of wool yarn are dyed in 1,000 parts of an aqueous bath containing
0.25 parts of the dyestuff C.I. No. 13 425
2 parts sulfuric acid
1.25 parts sodium sulfate and
2 parts of the water-soluble polyamide prepared from diethylene-triamine and acrylic acid methyl ester as described below, at boiling temperature for 3 hours, rinsed with water and subsequently dried.

The decrease of the wet tear resistance of the dyed yarn, referred to untreated yarn, amounts to 18.5 percent, the increase of the alkali-solubility to 37 percent, whereas a wool yarn treated under the same conditions but without the addition of the water-soluble polyamide exhibits a decrease of the wet tear resistance by 34.5 percent and an increase of alkali-solubility by 214 percent.

The polyamide used was prepared as follows:

206 parts diethylene-triamine and 172 parts acrylic acid methyl ester were first heated for 1 hour in a vacuum of 12 mm. Hg at 90°–100° C. and subsequently for 2 hours at 150°–160° C.

The brownish viscous substance thus obtained had an average molecular weight of 450.

EXAMPLE 2

25 parts of wool yarn are treated as in example 1, but the polyamide there mentioned is replaced with 2 parts of a polyamide prepared from tripropylene-(1,2)-tetramine and acrylic acid methyl ester.

The decrease of the wet tear resistance, referred to untreated yarn, amounts to 12.5 percent, the increase of alkali-solubility to 85 percent, whereas a sample of yarn treated in the same way but without the addition of the polyamide, exhibits a decrease of tear resistance by 32 percent and an increase of alkali-solubility by 214 percent.

The polyamide used was prepared as follows:
376 parts tripropylene-(1,2)-tetramine were mixed with 344 parts acrylic acid methyl ester at 40°–50° C., and heated for 1 hour under 12 mm. Hg at 90°–100° C. and subsequently for 3 hours at 140°–150° C. The substance obtained was hard and brittle at 20°–30° C., clearly soluble in water and had an average molecular weight of 700.

EXAMPLE 3

25 parts of wool yarn are treated as in example 1, but the polyamide there mentioned is replaced with 4 parts of a polyamide prepared from N-(2-hydroxyethyl)-ethylene-diamine and acrylic acid.

The decrease of the wet tear resistance, referred to untreated yarn, amounts to 11.5 percent, the increase of alkali-solubility to 32 percent, whereas a sample of yarn treated in the same way but without the addition of the polyamide, exhibits a decrease of tear resistance by 32 percent and an increase of alkali-solubility by 214 percent.

The polyamide used was prepared as follows:

208 parts N-(2-hydroxyethyl)-ethylene-diamine were mixed at 50°–60° C. with 144 parts acrylic acid and stirred at the same temperature for 3 hours. The reaction mixture was then heated for 2 hours at 140° C. and for 4 hours at 170°–180° C., and subsequently kept at the same temperature for 1½ hours under a vacuum of 12 mm. Hg.

The greenish brown viscous substance thus obtained had an average molecular weight of 400.

EXAMPLE 4

25 parts of wool yarn are treated as in example 1, but the polyamide there used is replaced with 3 parts of a polyamide prepared from bis-(3-aminopropyl)-methylamine and acrylic acid methyl ester. The yarn thus treated exhibits a decrease of wet tear resistance by 14 percent and an increase of alkali-solubility by 21 percent.

The corresponding values of the control sample treated without the addition of polyamide are 35 percent and 223 percent, respectively.

The polyamide used was prepared as follows:

290 parts bis-(3-aminopropyl)-methylamine were mixed at 40°–50 C. with 172 parts acrylic acid methyl ester and the mixture was subsequently heated in a vacuum of 12 mm. Hg first for 2 hours at 90°–100° C. and then for 1 hour at 150°–160° C. The highly viscous substance obtained clearly dissolved in water and had an average molecular weight of 2,400.

EXAMPLE 5

25 parts of wool yarn are treated as in example 1, but the polyamide there mentioned is replaced with 3 parts of a polyamide prepared from hexamethylene-diamine and diglycollic acid.

The yarn thus treated exhibits a decrease of wet tear resistance by 24.5 percent and an increase of alkali-solubility by 126 percent.

The corresponding values of a control sample treated without the addition of polyamide are 35 percent and 223 percent, respectively.

The polyamide used was prepared as follows:

116 parts hexamethylene-diamine and 134 parts diglycollic acid were mixed at 50°–60° C. and heated at 140°–150° C. for 1½ hours.

The brownish greasy reaction product obtained gave a turbid solution in water and had an average molecular weight of 470.

EXAMPLE 6

25 parts of wool yarn are treated as in example 1, but the polyamide there mentioned is replaced with 3 parts of a polyamide prepared from diethylene-triamine and succinic acid anhydride.

The yarn thus treated exhibits a decrease of wet tear resistance by 11 percent and an increase of alkali-solubility by 27 percent.

The corresponding values of a control sample treated without the addition of polyamide are 35 percent and 223 percent, respectively.

The polyamide used was prepared as follows:

200 parts succinic acid anhydride were added at 120°–130° C. within 1 hour to 206 parts diethylene-triamine, and the reaction mixture was subsequently heated for 3 hours under a pressure of 12 mm. Hg at 180°–190° C.

The solid yellowish reaction product thus obtained slowly dissolved in water and had an average molecular weight of 2,100.

EXAMPLE 7

25 parts of wool yarn are treated as in example 1, but the polyamide there mentioned is replaced with 4 parts of a polyamide prepared from ethylene-diamine and adipic acid.

The decrease of the wet tear resistance of the yarn thus treated amounts to 24 percent, the increase of the alkali-solubility to 124 percent. A yarn sample treated in the same way but without the addition of polyamide exhibits a decrease of wet tear resistance by 35.5 percent and an increase of alkali-solubility by 214 percent.

The polyamide used was prepared as follows:

90 parts ethylene-diamine were mixed at 90°–100° C. with 219 parts adipic acid and the mixture is then heated at 140°–150° C. for 2 hours. The clear melt is subsequently heated for 15 minutes under a pressure of 12 mm. Hg at 140°–150° C. The solid yellowish substance thus obtained gave an almost clear solution in water.

EXAMPLE 8

25 parts of wool yarn are treated as in example 1, but the polyamide there mentioned is replaced with 3 parts of a polyamide prepared from ethylene-diamine and maleic acid dimethyl ester.

The wet tear resistance of the yarn thus treated exhibits a decrease by 26 percent, the alkali-solubility an increase by 114 percent.

The corresponding values of a yarn sample treated in the same way but without the addition of polyamide are 35 percent and 223 percent, respectively.

The polyamide used was prepared as follows:

144 parts maleic acid dimethyl ester were mixed at 60°–70° C. with 60 parts ethylene-diamine, the mixture is heated to 110°–120° C., kept at this temperature for 3 hours and subsequently heated for 15 minutes under a pressure of 12 mm. Hg at 150°–160° C.

The reddish brown, glasslike, water-soluble substance obtained had an average molecular weight of 400.

EXAMPLE 9

25 parts of wool yarn are treated as in example 1, but the polyamide there mentioned is replaced with 3 parts of a polyamide prepared from diethylene-triamine and acrylamide.

The wet tear resistance of the yarn thus treated exhibits a decrease by 11 percent, the alkali-solubility an increase by 35 percent.

The corresponding values of a yarn sample treated in the same way but without the addition of polyamide are 30 percent and 206 percent, respectively.

The polyamide used was prepared as follows:

206 parts diethylene-triamine were mixed at 40°–50° C. with 142 parts acrylic acid amide and the mixture was stirred at the same temperature for 1 hour. 3.5 parts potassium hydroxide were subsequently added, and the mixture was at first heated at 190°–200° C. for 3 hours and then heated for a further 2 hours under a vacuum of 12 mm. Hg at the same temperature.

The greenish highly viscous liquid thus obtained had an average molecular weight of 350.

We claim:

1. In the known dyeing processes wherein protein-containing fiber materials or mixtures of such fiber materials with vegetable or synthetic fiber materials are treated in an acidic aqueous medium the improvement which consists in adding to the acidic aqueous medium water soluble polyamides having a molecular weight under about 2,000. which are obtained by reacting aliphatic polyamines of the formula

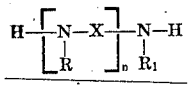

in which $R_1$ denotes hydrogen, an alkyl group or a hydroxyalkyl group with one–three carbon atoms, and R is hydrogen or an alkyl group, and X is a 2-valent, optionally substituted aliphatic radical with one–six carbon atoms, and $n$ stands for an integer from 1 to 4, with $\alpha,\beta$-unsaturated aliphatic monocarboxylic acids or aliphatic polycarboxylic acids, or aliphatic polycarboxylic acids containing—O—atoms, or their functional derivatives selected from the group consisting of their halides, amides, anhydrides and esters.

2. The product produced according to claim 1.

* * * * *